(12) United States Patent
Itoga

(10) Patent No.: US 7,871,105 B2
(45) Date of Patent: Jan. 18, 2011

(54) AIR BELT DEVICE

(75) Inventor: Yasuo Itoga, Tokyo (JP)

(73) Assignee: Takata Corporation, Tokyo (JP)

( * ) Notice: Subject to any disclaimer, the term of this patent is extended or adjusted under 35 U.S.C. 154(b) by 244 days.

(21) Appl. No.: 12/084,425

(22) PCT Filed: Nov. 9, 2006

(86) PCT No.: PCT/JP2006/322369

§ 371 (c)(1),
(2), (4) Date: May 1, 2008

(87) PCT Pub. No.: WO2007/058114

PCT Pub. Date: May 24, 2007

(65) Prior Publication Data

US 2009/0160168 A1    Jun. 25, 2009

(30) Foreign Application Priority Data

Nov. 16, 2005    (JP) .............................. 2005-331806

(51) Int. Cl.
*B60R 21/18* (2006.01)
(52) U.S. Cl. .................................... 280/733; 280/730.1
(58) Field of Classification Search .................. 280/733, 280/730.2, 730.1
See application file for complete search history.

(56) References Cited

U.S. PATENT DOCUMENTS

| 3,682,498 | A * | 8/1972 | Rutzki ........................ 280/733 |
| 5,642,902 | A * | 7/1997 | France ........................ 280/737 |
| 6,224,089 | B1 | 5/2001 | Uchiyama et al. |
| 6,276,712 | B1 * | 8/2001 | Welch et al. ............. 280/730.2 |
| 6,336,657 | B1 * | 1/2002 | Akaba et al. ................. 280/733 |
| 6,340,173 | B1 * | 1/2002 | Specht ........................ 280/733 |
| 6,406,058 | B1 * | 6/2002 | Devonport et al. .......... 280/733 |
| 6,419,264 | B1 * | 7/2002 | Tsuji et al. ................... 280/733 |
| 6,591,465 | B2 * | 7/2003 | Suyama ........................ 24/633 |
| 6,648,369 | B2 | 11/2003 | Mishima et al. |
| 6,715,788 | B2 * | 4/2004 | Saiguchi et al. .......... 280/730.1 |
| 6,997,473 | B2 | 2/2006 | Tanase et al. |
| 7,086,663 | B2 * | 8/2006 | Honda ...................... 280/730.2 |
| 7,168,736 | B2 | 1/2007 | Tanase et al. |
| 7,328,945 | B2 * | 2/2008 | Yoshikawa ................ 297/216.1 |
| 7,377,544 | B2 * | 5/2008 | Itoga .......................... 280/733 |
| 7,481,451 | B2 * | 1/2009 | Park .......................... 280/733 |

(Continued)

FOREIGN PATENT DOCUMENTS

JP    11-170949    6/1999

(Continued)

*Primary Examiner*—Paul N Dickson
*Assistant Examiner*—Nicole Verley
(74) *Attorney, Agent, or Firm*—Foley & Lardner LLP

(57) ABSTRACT

In an air belt device which has the gas-supply portion, such as an inflator, fixed therein, a connection between an air belt and a gas supply portion is simplified. A lap anchor 13 coupled to an end of a lap bag 15 is pivotally supported by a support shaft 13*p* such that the lap anchor 13 can turn back and forth with respect to a seat frame 2. The inflator 12 is fixed to be disposed on a side face of the seat frame 2. A substantially tubular gas-introducing path 16 extends from the lap bag 15. The gas-introducing path 16 is connected to a pipe 17 extending from the inflator 12 in a slack state.

7 Claims, 4 Drawing Sheets

U.S. PATENT DOCUMENTS

| | | | |
|---|---|---|---|
| 7,481,452 B2 * | 1/2009 | Itoga et al. | 280/733 |
| 7,584,991 B2 * | 9/2009 | Itoga et al. | 280/733 |
| 7,597,351 B2 * | 10/2009 | Kashiwagi | 280/730.2 |
| 7,665,761 B1 * | 2/2010 | Green et al. | 280/733 |
| 2002/0011723 A1 * | 1/2002 | Lewis | 280/735 |
| 2005/0134022 A1 | 6/2005 | Noguchi et al. | |
| 2007/0080526 A1 * | 4/2007 | Itoga | 280/733 |
| 2009/0230662 A9 * | 9/2009 | Itoga | 280/733 |

FOREIGN PATENT DOCUMENTS

| | | |
|---|---|---|
| JP | 11-170950 | 6/1999 |
| JP | 2000-85510 | 3/2000 |
| JP | 2002-187514 | 7/2002 |
| JP | 2004-204878 | 7/2004 |
| JP | 2004-351948 | 12/2004 |
| JP | 2005-178612 | 7/2005 |
| JP | 2005-271888 | 10/2005 |
| WO | WO 97/06983 | 2/1997 |
| WO | WO 02/100690 A1 | 12/2002 |

* cited by examiner

AIR BELT DEVICE

TECHNICAL FIELD

The present invention relates to air belt devices for restraining occupants in seats of vehicles, such as automobiles, in case of a collision.

BACKGROUND ART

In an air belt device, at least one of a shoulder belt and a lap belt is inflatable by gas supplied from an inflator.

Japanese Unexamined Patent Application Publication No. 11-170949 discloses an air belt which is connected to a buckle device constituted by a buckle base fixed to a seat base and a buckle body pivotally supported by the buckle base thereby allowing the buckle body to rock back and forth.

An inner space and a gas-supply path for supplying gas are provided in the buckle base and the buckle body, respectively. An inflator is attached to the buckle base.

DISCLOSURE OF INVENTION

When the inflator is activated, the gas is supplied from the inner space through the gas-supply path to the air belt.

Since the buckle body is rockably coupled to the buckle base, even when the buckle body rocks, the buckle base and the inflator connected to the buckle base do not rock. Therefore, the inflator does not interfere with other members.

Patent Document 1: Japanese Unexamined Patent Application Publication No. 11-170949.

According to the Japanese Unexamined Patent Application Publication No. 11-170949, since the buckle body is rockably coupled to the buckle base and the gas is supplied therethrough, the air belt device has a complex structure and is expensive to be produced.

DISCLOSURE OF INVENTION

An object of the present invention is to simplify a connection between an air belt and a gas supply portion in an air belt device which has the gas supply portion, such as an inflator, being fixed therein.

According to an air belt device of the present invention, the air belt device includes a gas supply portion and a bag to which gas is supplied from the gas supply portion to inflate the bag. The bag includes a bag body folded into a belt shape and a tubular gas-introducing path extending from the bag body. The gas-introducing path is connected to the gas supply portion in a slack state.

An end of the gas supply portion may be inserted into the gas-introducing path, a soft tube may be connected to the end of the gas supply portion, and the gas may be supplied from the gas supply portion through the soft tube to the bag body.

The gas supply portion may be an inflator or a pipe which is connected to the inflator.

The bag may be a lap bag and the gas supply portion may be disposed on a seat frame.

BEST MODE FOR CARRYING OUT THE INVENTION

According to an air belt device of the present invention, gas from a gas supply portion is introduced into a bag through a gas-introducing path. Since the gas-introducing path is substantially tubular and is slack, even if the gas supply portion is disposed in a fixed manner, the bag can flexibly rock.

When the gas is supplied from the gas supply portion to a bag body through a soft tube connected to the gas supply portion, hot gas from an inflator does not come into direct contact with the inner face of the gas-introducing path directly. Therefore, the demand for the gas-introducing path to have characteristics of heat resistance and strength, for example, is reduced.

The gas supply portion connected to the gas-introducing path may be an inflator or a pipe connected to the inflator.

According to the present invention, the bag is preferably a lap bag. In this case, the lap bag is rockably attached at an end to a seat frame through a lap anchor, the gas supply portion is connected to the seat frame, and the gas supply portion is connected to the gas-introducing path extending from the lap bag, whereby the lap bag is constructed so as to be rockably coupled to the seat frame.

Embodiments of the present invention will be described below with reference to the accompanying drawings.

Figure 1A:
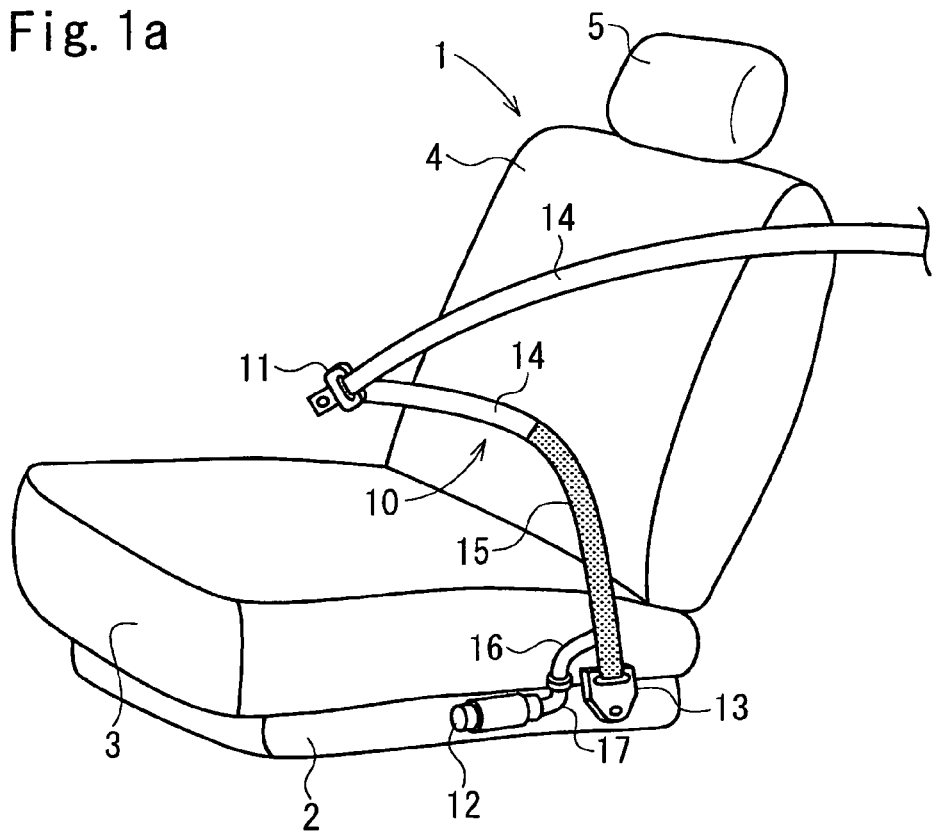
FIGS. 1a and 1b are perspective views of a seat provided with an air belt device according to an embodiment.
Figure 1B:
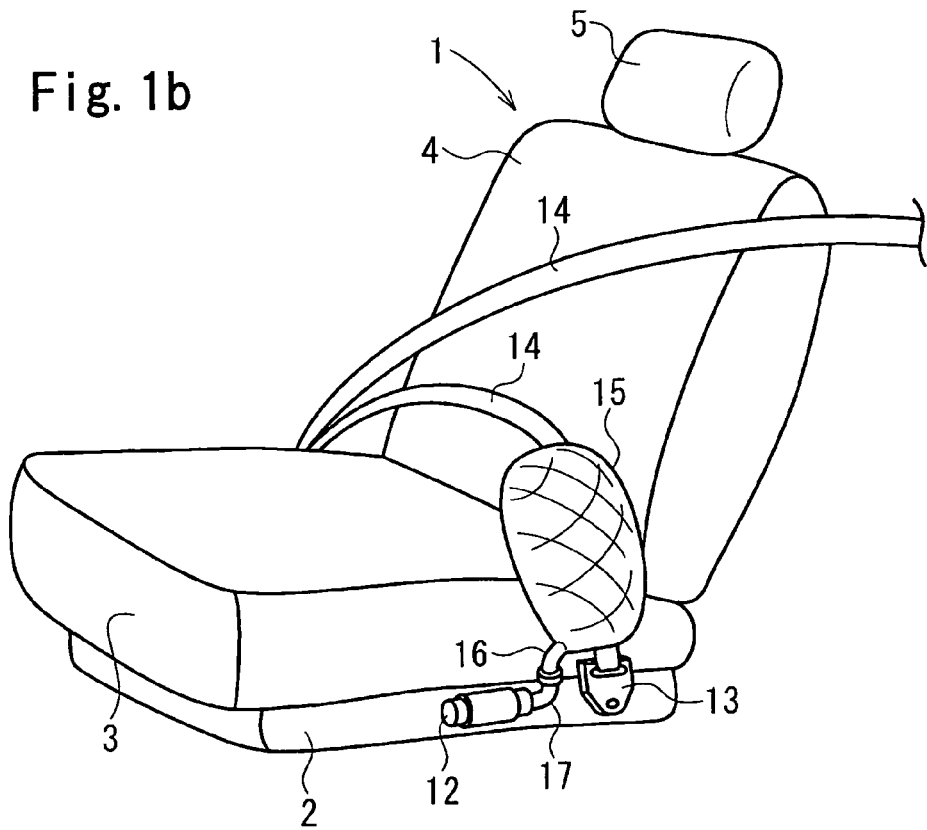
Figure 2:
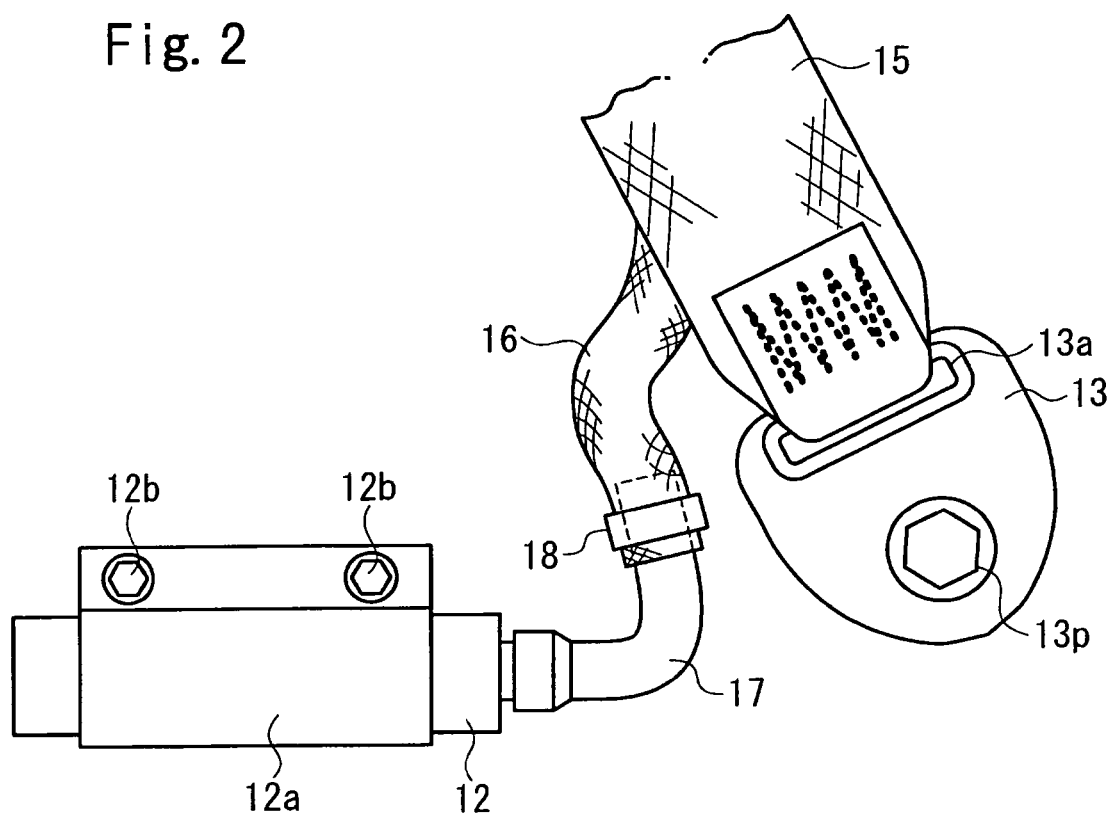
FIG. 2 is a front view of the vicinity of a lap anchor of the air belt device of FIG. 1.
Figure 3:
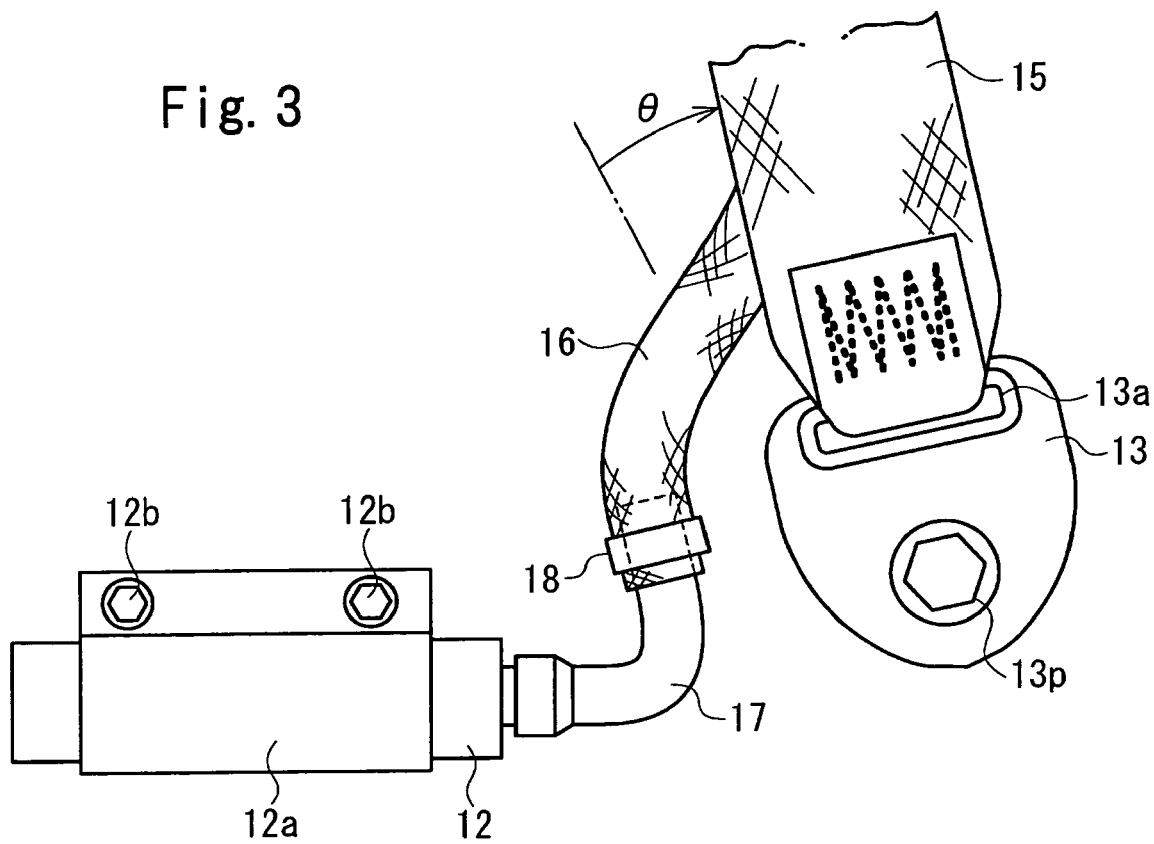
FIG. 3 is a front view of the vicinity of the lap anchor of the air belt device of FIG. 1.

FIGS. 1a and 1b are perspective views illustrating a seat provided with an air belt device according to an embodiment of the present invention. FIGS. 2 and 3 are front views of a portion around a lap anchor. Note that FIG. 1a shows an air belt which is not inflated and FIG. 1b shows the air belt in an inflated state. FIG. 2 shows a state of the lap anchor being in a neutral position (a state in which the lap anchor is approximately in the middle position between a forward turn limit and a backward turn limit). FIG. 3 shows a state of the lap anchor rotated to the backward turn limit from the neutral position.

A seat 1 of an automobile includes a seat frame 2, a seat cushion 3 mounted on the seat frame 2, a seat back 4 which can be reclined and is disposed so as to stand from a rear portion of the seat cushion 3, and a headrest 5 attached at the top of the seat back 4. An air belt 10 is withdrawn and fitted around the front of an occupant sitting on the seat 1. A buckle device (not shown) to which a tongue 11 of the air belt 10 is detachably coupled is provided on one side face of the seat frame 2, that is, on a side face of the seat frame 2 closest to the vehicle cabin center. An inflator 12 and a lap anchor 13 are provided on the other side face of the seat frame 2, that is, on a side face of the seat frame 2 adjacent to a side face (a door, for example) of the cabin.

The lap anchor 13 is pivotally supported by a support shaft 13p such that the lap anchor 13 can turn back and forth with respect to the seat frame 2.

The air belt 10 includes a webbing 14 extending through the tongue 11, and a lap bag 15 to which one end of the webbing 14 is connected. The other end of the webbing 14 extends through a shoulder anchor (not shown) provided on a pillar of a vehicle body, and is connected to a seat belt retractor (not shown) in a retractable manner.

The lap bag 15, although not shown, includes a bag body and a tubular cover for covering the bag body. The bag body is normally, folded into an elongated flat shape. The cover has a size that fits the periphery of the folded bag body when the bag body is not in an inflated state, whereas the cover expands in the peripheral direction to allow the inflation of the bag body.

The cover is coupled at one end to the webbing 14 by sewing, for example. The other end of the cover extends through an opening 13a provided in the lap anchor 13 and is coupled to the lap anchor 13.

In this embodiment, the cover is made of textile fabric which is capable of flexibly expanding in the peripheral direction but is negligibly capable of expanding in the longitudinal direction. Therefore, when the bag body inflates, the mesh of the cover stretches in the peripheral direction in accordance with the stretch of the cover in the peripheral direction. As a result, the length of the cover in the longitudinal direction is reduced. Accordingly, the webbing 14 is tightened and is more securely fastened around the occupant's body.

A substantially tubular gas-introducing path 16 extends from the bag body. The gas-introducing path 16 is drawn out of an end of the cover in the vicinity of the lap anchor 13.

The inflator 12 is fixed by a holder 12a to be disposed on a side face of the seat frame 2 (on the side face of the seat frame 2 on which the lap anchor 13 is disposed). Reference numeral 12b illustrates attachment members such as bolts to fix the holder 12a to the seat frame 2. In this embodiment, the inflator 12 is arranged at a position closer to a front-end side of the seat frame 2 than the lap anchor 13.

In this embodiment, a pipe 17 for supplying the gas is coupled to a gas-ejecting port (not shown) of the inflator 12 and the gas-introducing path 16 is connected to the pipe 17. In this embodiment, specifically, an end of the pipe 17 is inserted into the gas-introducing path 16 and the gas-introducing path 16 is fastened tightly to the pipe 17 by a band 18, whereby the gas-introducing path 16 is coupled to the pipe 17 to allow the gas to flow therethrough.

As shown in FIGS. 2 and 3, the gas-introducing path 16 is connected to the pipe 17 in a slack state. That is, the gas-introducing path 16 is slack not only when the lap anchor 13 is in the neutral position as shown in FIG. 2, but also when the lap anchor 13 turns toward the backward turn limit indicated by the arrow θ shown in FIG. 3 (or till the lap anchor 13 reaches the backward turn limit). Accordingly, the gas-introducing path 16 is not tense between the pipe 17 and the lap bag 15 irrespective of a position of the lap anchor 13.

An operation of the air belt device will now be described.

When a collision of the vehicle is detected, the inflator 12 is operated to eject gas. The gas from the inflator 12 is fed into the lap bag 15 through the pipe 17 and the gas-introducing path 16 to inflate the lap bag 15. Since the length of the lap bag 15 is reduced when inflating, pretension is applied to a lap portion, whereby the hip of the occupant is restrained on the seat. In addition, any shock applied to the hip of the occupant is absorbed by the lap bag 15. Note that since the inflated lap bag 15 is interposed between a sidewall (a door, for example) of a vehicle cabin and the occupant, the lap bag 15 restrains the occupant's hip from moving toward the sidewall of the vehicle cabin. In addition, the lap bag 15 functions as a buffer if the sidewall of the vehicle cabin intrudes toward the occupant in the cabin.

In this air belt device, the gas-introducing path 16 for connecting the inflator 12 (pipe 17) and the lap bag 15 to each other is slack. Therefore, even when the inflator 12 is disposed in a fixed manner on the seat frame 2, the lap bag 15 can flexibly rock.

Figure 4:
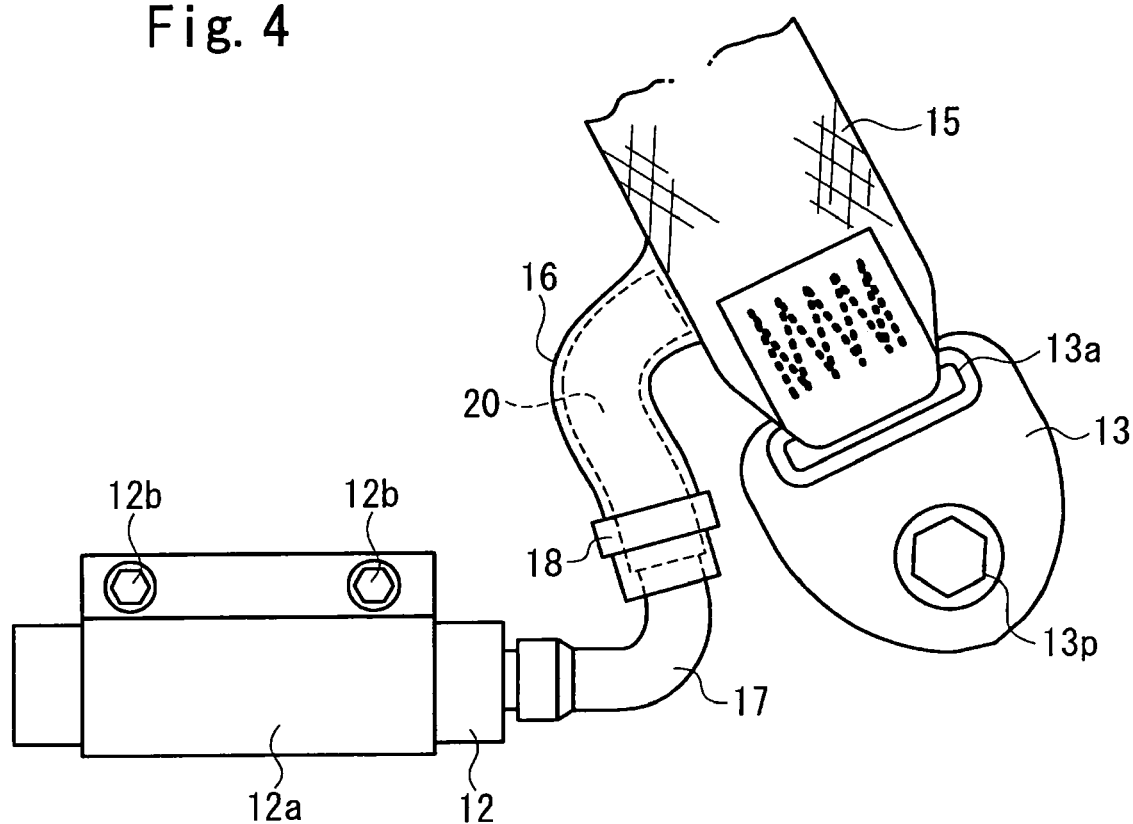
FIG. 4 is a front view of the vicinity of a lap anchor of the air belt device according to another embodiment.

FIG. 4 is a front view around the lap anchor of the air belt device according to another embodiment of the present invention.

In this embodiment, a soft tube 20, such as a rubber tube or a synthetic-resin soft tube, is coupled to an end of the pipe 17 extending from the inflator 12 so that the soft tube 20 serves as an extension of the pipe 17. The gas-introducing path 16 is connected to the pipe 17, as shown in the figure, so as to accommodate the soft tube 20 therein.

In this embodiment, the soft tube 20 extends to the vicinity of a base end of the gas-introducing path 16. Alternatively, the soft tube 20 may extend into the lap bag 15 (bag body) or may extend up to a point anywhere along the length of the gas-introducing path 16. Materials of the soft tube 20 are not limited as long as the soft tube 20 can flexibly be bent in accordance with the rocking motion of the lap bag 15. Preferably, the materials should have heat resistance.

The other structures of this embodiment are similar to those of the embodiment described previously.

According to the air belt device of this embodiment, since the gas supplied from the inflator 12 is fed into the lap bag 15 through the soft tube 20 connected to the pipe 17, hot gas supplied from the inflator 12 is negligibly or never in contact with the inner face of the gas-introducing path 16 directly. Consequently, the demand for the gas-introducing path 16 to have characteristics of heat resistance, strength, for example, is reduced.

In each of the embodiments described above, for example, although the gas-introducing path 16 of the lap bag 15 and the inflator 12 are connected to each other through the pipe 17, the gas-introducing path 16 may be directly connected to the inflator 12.

The embodiments described above are mere examples of the present invention and the present invention is not limited to these embodiments.

The present invention contains subject matter related to Japanese Patent Application JP 2005-331806 filed in the Japanese Patent Office on Nov. 16, 2005, the entire contents of which are incorporated herein by reference.

The invention claimed is:

1. An air belt device comprising a gas supply portion having an inflator, and a bag to which gas is supplied from the gas supply portion to inflate the bag, the bag including a bag body folded into a belt shape, and a tubular gas introducing path extending from the bag body,
    wherein the gas introducing path is connected to the gas supply portion in a slack state,
    wherein an end of the gas supply portion is inserted into the gas introducing path, a soft tube is connected to the end of the gas supply portion, and the gas is supplied from the gas supply portion through the soft tube to the bag body, and
    wherein the gas introducing path corresponds to the shape of the soft tube along substantially the entire length of the soft tube.

2. The air belt device according to claim 1, wherein the gas supply portion is the inflator.

3. The air belt device according to claim 1, wherein the gas supply portion includes the inflator and a pipe connected to the inflator.

4. The air belt device according to claim 1, wherein the bag is a lap bag and the gas supply portion is disposed on a seat frame of a seat.

5. The air belt device according to claim 4,
    wherein a lap anchor is attached to the seat frame so as to turn back and forth with respect to the seat, and
    the lap bag is connected to the lap anchor.

6. The air belt device according to claim 5,
    wherein the gas supply portion is arranged in front of the lap anchor, and
    even when the lap anchor turns to a backward turn limit, the gas-introducing path is in a slack state.

7. The air belt device according to claim 1, wherein the soft tube is configured to maintain an open gas supply path during inflation of the bag by the inflator.

* * * * *